United States Patent
Lum et al.

(10) Patent No.: US 9,047,923 B1
(45) Date of Patent: Jun. 2, 2015

(54) FAST SHINGLED TRACKS RECORDING

(71) Applicant: Seagate Technology LLC, Cupertino, CA (US)

(72) Inventors: CheeWai Lum, Singapore (SG); WenXiang Xie, Singapore (SG); Xiong Liu, Singapore (SG); Jian Qiang, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/307,805

(22) Filed: Jun. 18, 2014

(51) Int. Cl.
*G11B 27/36* (2006.01)
*G11B 5/012* (2006.01)

(52) U.S. Cl.
CPC ............... *G11B 27/36* (2013.01); *G11B 5/012* (2013.01)

(58) Field of Classification Search
None
See application file for complete search history.

(56) References Cited

U.S. PATENT DOCUMENTS

| | | | |
|---|---|---|---|
| 7,996,645 B2 | 8/2011 | New et al. | |
| 8,537,481 B1 | 9/2013 | Bandic et al. | |
| 8,593,748 B1 | 11/2013 | Bandic et al. | |
| 8,699,175 B1* | 4/2014 | Olds et al. | 360/78.14 |
| 2009/0310249 A1* | 12/2009 | Michinaga | 360/77.02 |
| 2011/0292538 A1* | 12/2011 | Haga et al. | 360/60 |
| 2012/0069466 A1* | 3/2012 | Okamoto et al. | 360/78.04 |
| 2012/0300327 A1* | 11/2012 | Moser et al. | 360/31 |
| 2012/0300341 A1* | 11/2012 | Matsuo et al. | 360/77.02 |
| 2013/0027800 A1* | 1/2013 | Park et al. | 360/31 |
| 2013/0148225 A1* | 6/2013 | Coker et al. | 360/31 |
| 2013/0318295 A1 | 11/2013 | Kojima | |

* cited by examiner

*Primary Examiner* — Thang Tran
(74) *Attorney, Agent, or Firm* — HolzerIPLaw, PC

(57) ABSTRACT

Implementations disclosed herein provide a method comprising determining used shingled data tracks adjacent to a target track using a track usage monitoring scheme, and reading the used shingled data tracks to perform a write operation to the target track.

20 Claims, 4 Drawing Sheets

FAST SHINGLED TRACKS RECORDING

BACKGROUND

Shingled magnetic recording allows for increased cell density, but generally entails re-writing an entire band of shingled data when one or more cells within the band are changed. As a back-up during the re-writing, the data is temporarily saved to a second, temporary, memory (e.g., a media cache, etc.).

SUMMARY

In one implementation, this disclosure provides a method comprising determining used shingled data tracks adjacent to a target track using a track usage monitoring scheme, and reading the used shingled data tracks to perform a write operation to the target track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
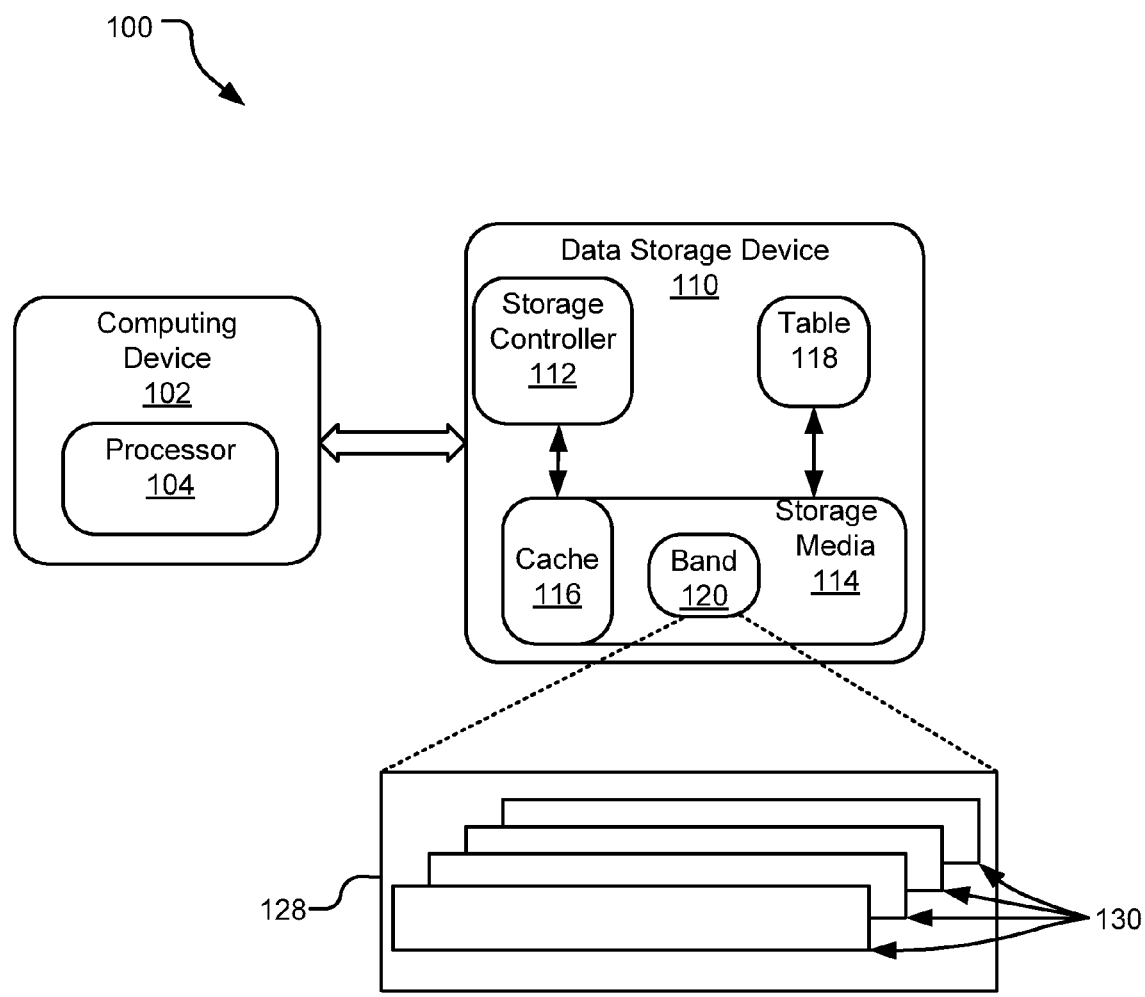
FIG. 1 illustrates a block diagram of an example data storage device system.

The present disclosure is directed to data storage systems and devices that include storage areas or locations. Beside of main data storage area (main store), some implementations of the data storage systems and devices use one or more of such plurality of data storage areas or locations for temporary storage of data. Such temporary storage areas may include media cache, etc. A storage controller of such data storage systems may be used for a variety of purposes, including storing data in a media cache or a buffer in response to write commands received from a host or computing device, storing data in media cache for a rewrite operation, storing data in the media cache for write operation optimization purposes, etc.

In non-shingled magnetic media, each of the cells on a magnetized medium are of a sufficiently large size relative to the size of the write pole to allow the write pole to write data to the cells without overwriting data in any surrounding cells. As a result, data may be written to available cells anywhere on the magnetic medium. However, as requirements for data storage density increase for magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of adjacent cells (i.e., overwriting the adjacent cells). One technique for adapting the magnetic medium to utilize smaller cells while preventing adjacent data being overwritten during a write operation is shingled magnetic recording (SMR).

In SMR, data recording density on a disk is increased by writing a track of data to partially overlap an adjacent data track, resulting in a "shingled" track structure. SMR utilizes a large strong write field generated by the write pole. One constraint of shingled magnetic recording is that when data is written to the magnetic media, it is written in sequentially increasing or decreasing radius tracks. The strong write field from the wide writer affects one or more adjacent tracks including the track being written to and one or more previously-written tracks located in down-track from the track being written to. As a result, in order to change any data cell within the shingled tracks, all of the data within the shingled tracks is re-written in the selected forward sequential write order.

When an SMR device receives a write command to write new data to a disk or a modify command to modify some existing data on a disk, the SMR device responds to the write and/or modify command(s) by reading and copying all of the data into a data band. The new material may be written, where such a data band may include a plurality of shingled data tracks located in drive's main store.

For a SMR drive with static logical block address to physical block address mapping, random user data may be written to media cache in a way of sequential for fast host response. In background process, the user data will be consolidated and then move to drive's main store during media cache cleaning process. The media cache cleaning may be achieved through a band update process. For example, an SMR band update process, such as one using a band rewrite operation (BRO), may be used to update a band(s). A BRO involves updating a band with a large fraction of sectors that have no new data, the addresses of which do not need to be accessed in any way.

The BRO operation may include a read step, wherein data is read from a band and stored into the buffer. Subsequently, during a modify step, new data is combined with the data stored in the buffer. A write step follows next, which involves writing the combined data from the buffer. The last write step occurs at a final resting place in the main store on the media wherein the data from the buffer is written to the SMR band. There may be numerous revolutions required for the average SMR data update process to update data on a band of SMR media. Each of such revolutions may encounter errors in reading data, writing data, etc. Also, the bigger the band size, the poorer the efficiency of media cache cleaning due to operation amplification. It is desirable to speed up the SMR data update process to prevent the media cache from being saturated.

In the disclosed technology, methods and systems comprise using a track usage monitoring scheme in order to minimize the usage of media cache (e.g., upon write, modify, commands) and band updating reduces the overall operation amplification. Such methods and systems may take place in a static band mapping scheme.

Specifically, in the disclosed technology, when there is a request to move user's data from media cache or buffer to drive's main store, its target track location (a track in a band where the data in the write request will be written) in a band of shingled tracks is determined. The disclosed technology monitors the usage of various tracks in SMR band and logs such usage information, such as which shingled tracks in a band have been used and which shingled tracks are fresh (i.e., unused). In one implementation, this track usage monitoring data is tabulated in a track usage table. By storing this track usage monitoring data, when a write request is received, it can be determined from the track usage table whether used tracks are located adjacent to the target track location. If the adjacent down tracks are identified as used tracks, only the data from such adjacent used tracks (as opposed to fresh tracks) may be read to buffer. Subsequently, the data from such adjacent used tracks can be combined with the initial write request data from either media cache or buffer. The combined used tracks data and initial write request data is then written back to the target track location. The track usage table can be updated with the new information regarding what tracks in the band are used and fresh. In another example, if the adjacent down track is fresh, the new data from host can be directly written to the target track location with no media cache involved.

The disclosed technology minimizes the average data read and rewritten on the SMR data band as well as minimizes the data written to the media cache. As a result, media cache cleaning efficiency is increased. If it is determined that one or more adjacent tracks are unused, data may no longer be read back starting from a targeted track until the last track of a band (for example, in FIG. 2, reading back and re-writing from track 6 through track 50). In such implementation, one or more tracks that are unused are not read into the media cache as part of read-modify-write operation, there is no combining of data from such unused tracks, and no writing back of data. For example, in BRO, the data of these unused tracks will not be read back and re-written, and hence improve the BRO efficiency. As a result, the systems and methods disclosed herein improve drive performance, reduce power consumption, reduce wear and tear of the system components, and improve the overall reliability of the hard disk by reducing the overall disc operation.

FIG. 1 illustrates a block diagram of an example data storage system 100, showing various functional components used to control the operation of a data storage device 110 (e.g., an SMR HDD, an SMR SSHD, an object storage device, etc.). The system 100 includes a computing or host device 102 (e.g., a computer, a mobile device, the internet, etc.) operably connected to the data storage device 110, each of the host device 102 and the data storage device 110 communicating with each other.

A processor 104 is located in the host device 102. The processor 104 sends one or more read or write commands to a storage device controller 112 for execution. As control communication paths are provided between a host device 102 and the storage device controller 112, the storage device controller 112 provides communication and control for the data storage device 110.

A storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a non-volatile cache 116 that is either a storage area on the storage media 114 or another non-volatile memory accessible by the data storage device 110. In the depicted system 100, the cache 116 is a storage area on the storage media 114. A band of shingled tracks 120 may also be located on the storage media 114. In an exploded view 128, the shingled tracks 130 located in the band 120 are shown. An implementation of the shingled tracks 130 is arranged such that when data is written to one of the shingled tracks 130 (except for the last data track), the writing operation affects data on an adjacent track in a down-track direction.

The data storage device 110 may write data to the storage media 114, and more specifically to one or more of the cache 116 and the band 120. A track usage table 118 may be located in the data storage device 110, wherein track usage data is tabulated regarding whether specific tracks on a band (e.g., 130) are used or fresh (unused). Such track usage data is utilized, as described in the disclosed methods and systems below, in order to more efficiently write data to a band of shingled tracks.

In the disclosed technology, a write request may be received to write data to the storage media, such as the shingled band 120. The storage controller 112 stores the write data in the cache 116. Furthermore, the storage controller 112 analyzes the write request to determine a specific target location on the storage media 114. If it is determined that the write data is to be stored on the shingled band 120, the storage controller 112 further determines the particular track on the shingled band 120 where the write data should be written. After determining the target track, the storage controller 112 reviews the track usage table 118 to determine whether a track adjacent to the target track (in the down-track direction) is a used track or an unused (fresh) track. If it is determined that such an adjacent track is a used track, it includes data that needs to be read to the cache 116 before writing to the target track, otherwise, writing data to the target track may adversely affect the data in such adjacent track. Therefore, the storage controller 112 reads and stores the data from such used adjacent track to the cache 116.

On the other hand, if it is determined that such adjacent track is an unused or fresh track, in the sense that there is no data in such adjacent track, writing data to the target track does not affect data in such an unused track (as there is no data in such unused track or the data in such an unused track is not important). In such a case, no data is read from the unused adjacent track. Not reading the data from the unused adjacent track saves a number of operations for the storage controller 112, as it does not read the data from an unused adjacent track, does not store the data in the cache 116, and does not combine the read data from the unused adjacent track with the write data of the write operation. Furthermore, the write operation to the shingled band 120 does not require writing to all the tracks (down-track from the target track), which expedites the SMR write operation as well.

Figure 2:
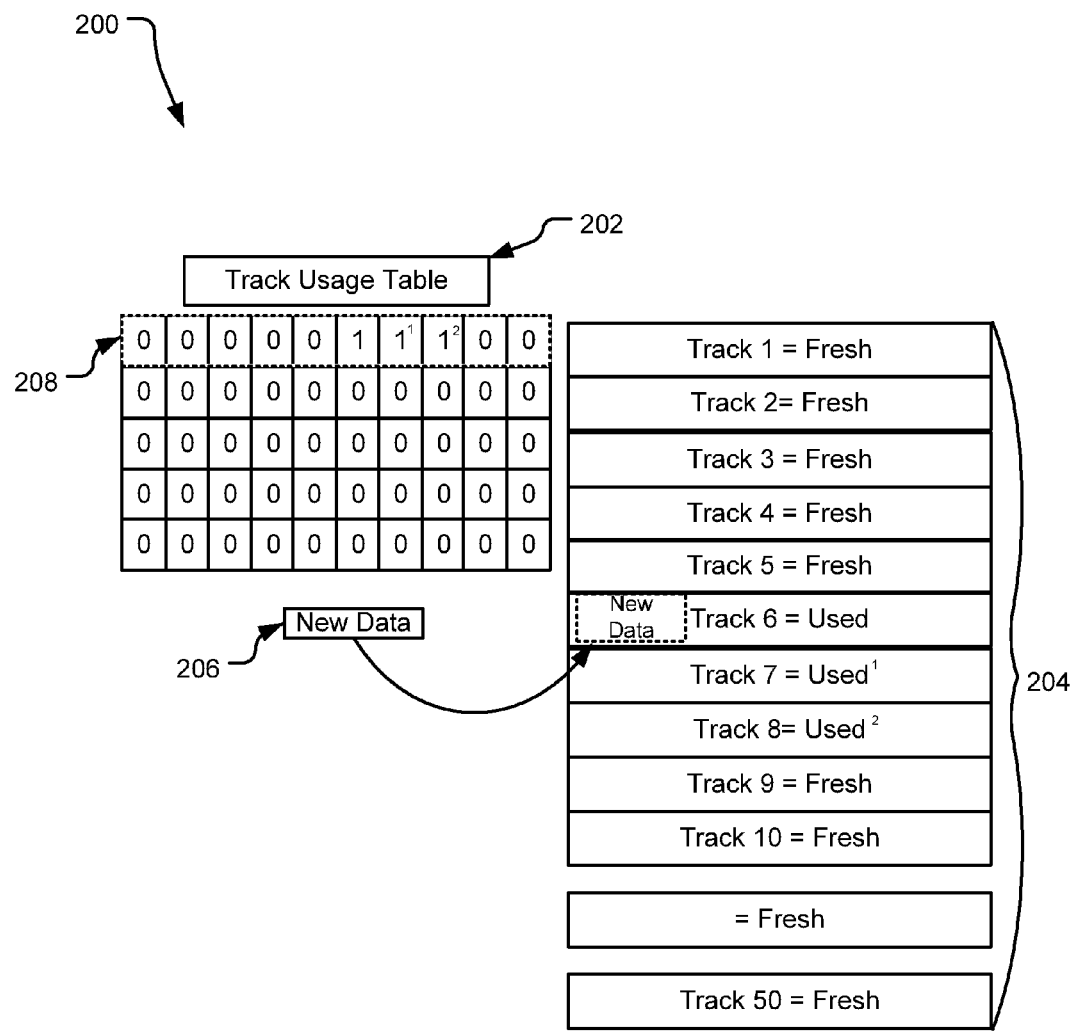
FIG. 2 illustrates an example track usage table system.

FIG. 2 illustrates an example system 200 comprising a track usage table 202. The track usage table 202 tabulates which tracks on the band 204 are used and which tracks are fresh. While the illustrated implementation only discloses a track usage table for a band 204, a number of such track usage tables, each tracking the usage for one of a number of tracks on a storage media may be provided. The track usage table 202 may be stored on a section of the storage media or in other non-volatile memory that is accessible to a storage controller.

As shown in FIG. 2, a band 204 comprises tracks numbered 1-50. Specifically, the band 204 is a shingled band in that the tracks 1-50 are shingled in the direction from track 1 to track 50 (referred to as the down-track direction). As a result of the shingled implementation of the tracks, any time data is written to a track$_i$, it affects the data in an adjacent track$_{i+1}$. Thus, when data is written to track 5, it affects data in track 6, etc.

In band 204, tracks 1-5 and 9-50 are shown as "fresh" (containing no data). Tracks 6, 7 and 8 are shown in band 204 as "used." The track usage table 202 tabulates data regarding track usage, providing values of "0" for the fresh tracks and values of "1" for the used tracks. The first line 208 of values in the track usage table 202 corresponds to the band 204. The first five values and last two values are "0", corresponding to tracks 1-5 and 9-10 in band 204, which are all fresh tracks. The track 6, track 7 and track 8 values in the table are "1," "1$^1$" and "1$^2$" corresponding to tracks 6, 7 and 8 in band 204, which are used tracks.

In the disclosed technology, when a request for writing new data 206 is made, and it is determined that a target location for the new data 206 to be written is on track 6, the track usage table 202 is used to provide information regarding the tracks adjacent to the target location (track 6). Specifically, the track usage table provides data that tracks 6, 7 and 8 are used, and tracks 1-5 and 9-50 are fresh. Rather than copying tracks 7 to 50 into the buffer and combining the new data 206 with the data from tracks 7 to 50, identifying the used adjacent tracks enables an operation where only adjacent used tracks may be copied into the buffer and for combination with the new data 206 which is already in the buffer. As such in this case, only the data from the tracks 7 and 8 are read and copied to the buffer and combined with the new data 206. After combination, the combined data of tracks 7 and 8 and the new data 206 may be written to tracks 6, 7, and 8. As a result, tracks 9-50 are not involved and therefore, the overall disc read & write operation is minimized. Media cache cleaning is more efficient.

While the example of FIG. 2 illustrates a use case where all of the tracks 9-50 are fresh, in an alternative use case, only one track down-track from the target track has to be fresh to obtain the benefits of the disclosed technology. For an example system 300 shown in FIG. 3, while writing data to track 6 if it is determined that the tracks 7 and 8 are used, track 9 is fresh, and tracks 10-50 are used, the storage controller is required to use only data from tracks 7 and 8, even when tracks 10-50 are used. In other words, the storage controller reads data from adjacent down-track tracks until it finds a fresh track and data from the remaining down-track tracks is not read, even if such tracks include one or more tracks that are determined to be used tracks.

Figure 3:
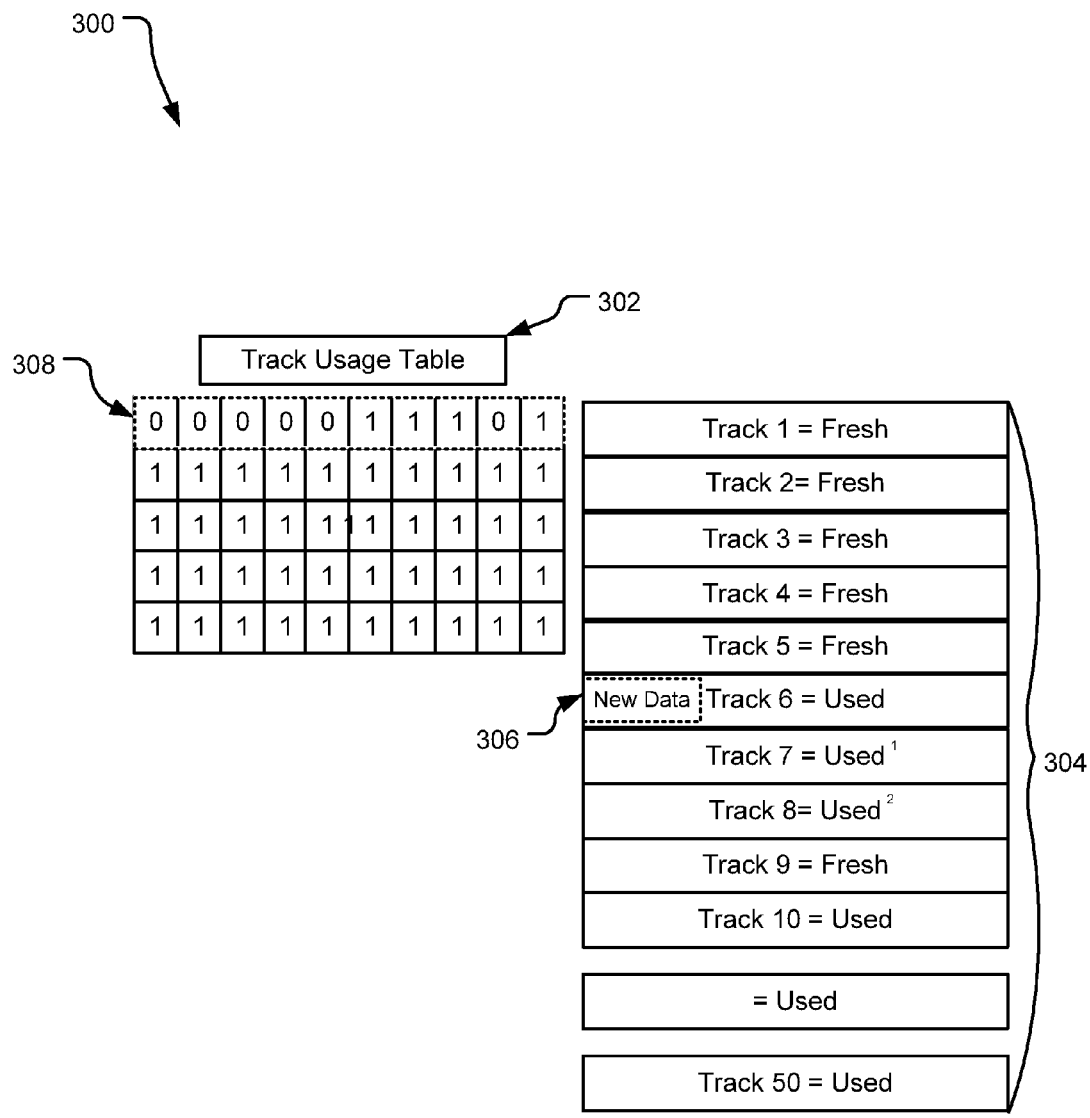
FIG. 3 illustrates an alternative example track usage table system.

After the combined tracks 7 and 8 and new data 306 (at track 6) are written back into the band 304, the track usage table 302 may be updated with new information regarding which tracks in band 304 are fresh or used. FIG. 3 also illustrates an example usage table, which correlates to the band 304 showing that tracks 6, 7, 8, and 10-50 are all labeled "used." The track usage table 302 shows in line 308, that tracks 1 through 5 and 9 are fresh by the corresponding value of "0." Line 308 also shows that tracks 6, 7, 8, and 10 are "used" by the corresponding values of "1."

Figure 4:
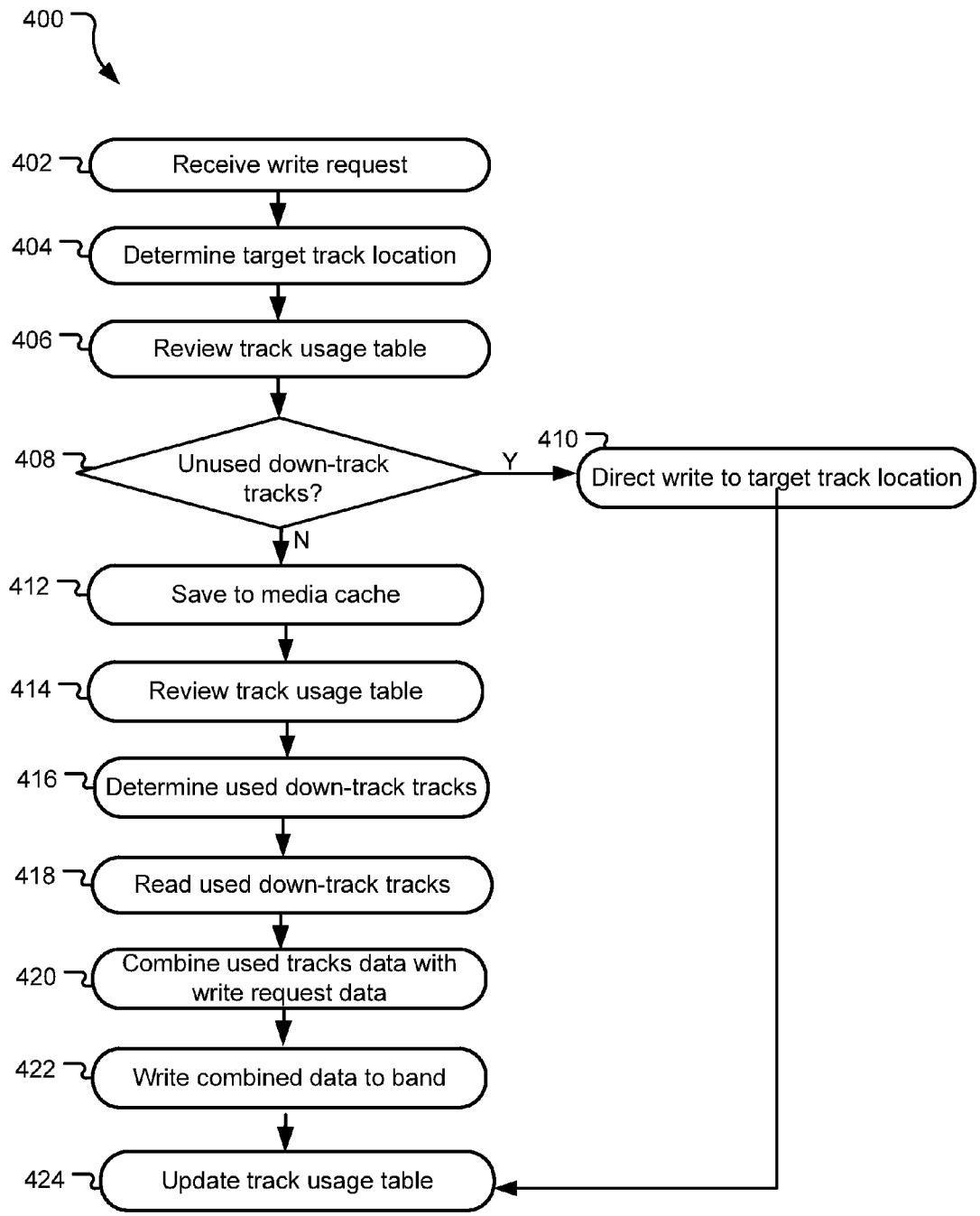
FIG. 4 illustrates a flowchart of example operations for using a track usage table system.

FIG. 4 illustrates a flowchart of example operations 400 for using a track usage table system. A write request is received in a receiving operation 402. A target track location on a band is determined in a determining operation 404. A track usage table may be reviewed for data providing whether tracks adjacent to the target track location are used or fresh in a reviewing operation 406. A determining operation 408 uses the track usage table to determine whether the next down-track track is unused or used. If the down-track track is unused, data is directly written to a target track location in a writing operation 410. Then, after being directly written to a target track location, the track usage table is updated in an updating operation 426.

If the down-track track is not unused (or used), the write request data is stored to a media cache in a saving operation 412. When the data in the media cache is required to be moved into the drive's main store in background process, the track usage table may be reviewed again for data providing whether tracks adjacent to the target track location are used or fresh in a reviewing operation 414. It is then determined whether there are used down-track tracks in a determining operation 416.

Operation 418 reads the data from the used track until the next fresh track. Thus, for example, if the target track is track 6 and the next down-track fresh track is track 15, the operation 412 reads data from the used tracks 7 to 14.

The used tracks are combined with the initial write request data in the media cache in a combining operation 420. The combined used tracks and initial write request data is written to the media beginning at the target location in a write operation 422. The track usage table is updated with new data regarding the status of the tracks in the band in an updating operation 424.

In addition to methods and systems, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

The above specification, examples, and data provide a complete description of the structure and use of example implementations of the invention. Since many implementations of the invention can be made without departing from the spirit and scope of the invention, the invention resides in the claims hereinafter appended. Furthermore, structural features of the different implementations may be combined in yet another implementation without departing from the recited claims. The implementations described above and other implementations are within the scope of the following claims.

What is claimed is:

1. A method comprising:
   providing a media having shingled data tracks;
   determining used shingled data tracks adjacent to a target track from the media using a track usage monitoring scheme
   reading the determined used shingled data tracks; and performing a write operation to the target track based on data read from the determined used shingled data tracks.

2. The method of claim 1, wherein reading the used shingled data tracks is performed in response to a data write request.

3. The method of claim 1, wherein reading the used shingled data tracks is performed in response to a cleaning request.

4. The method of claim 1, wherein reading the used shingled data tracks is performed in response to an update request.

5. The method of claim 1, further comprising utilizing a track usage table to determine adjacent used shingled data tracks.

6. The method of claim 2, comprising storing write request data to a media cache.

7. The method of claim 5, further comprising copying the data read from the determined used shingled data tracks into a media cache.

8. The method of claim 6, further comprising combining the data read from the determined used shingled data tracks with the write request data stored in the media cache.

9. The method of claim 8, further comprising writing the combined data read from the determined used shingled data tracks and write request data stored in the media cache to a target track location on the storage media.

10. The method of claim 5, further comprising updating the track usage table.

11. A system comprising:
a storage media having shingled data tracks;
a read/write device to read/write data from/to the storage media; and
a storage controller connected to the read/write device to determine used shingled data tracks adjacent to a target track using a track usage table, and to control the read/write device to read the determined used shingled data tracks and to perform a write operation to the target track based on read data from the determined used shingled data tracks.

12. The system of claim 11, wherein the determined used shingled data tracks are read in response to a data write request.

13. The system of claim 11, wherein the determined used shingled data tracks are read in response to a cleaning request.

14. The system of claim 12, wherein the storage controller further stores write request data to a media cache.

15. The system of claim 12, further comprises a static band mapping scheme.

16. The system of claim 14, wherein the storage controller further copies data read from the determined used shingled data tracks into a media cache.

17. The system of claim 16, wherein the storage controller further combines the determined used shingled data tracks with write request data stored in the media cache.

18. The system of claim 17, wherein the storage controller further controls the read/write device to write the combined determined used shingled data tracks and write request data to a target track location.

19. The system of claim 18, wherein the storage controller further updates the track usage table.

20. One or more non-transitory computer-readable storage media encoding computer-executable instructions for executing on a computer system a computer process that reads only used shingled data tracks adjacent to a target track location, the computer process comprising:
determining used shingled data tracks adjacent to a target track using a track usage table; reading used shingled data tracks in response to a write request;
storing write request data to a media cache;
utilizing the track usage table to determine adjacent used shingled data tracks;
copying the used shingled data tracks into a media cache;
combining the used shingled data tracks with write request data stored in the media cache;
writing the combined used shingled data tracks and write request data stored in the media cache to a target track location; and
updating the track usage table.

* * * * *